W. HAYDEN.
SPRING WHEEL.
APPLICATION FILED OCT. 20, 1910.

989,256.

Patented Apr. 11, 1911.

2 SHEETS—SHEET 1.

Witnesses

Inventor
W. Hayden
By Attorneys

W. HAYDEN.
SPRING WHEEL.
APPLICATION FILED OCT. 20, 1910.

989,256.

Patented Apr. 11, 1911.
2 SHEETS—SHEET 2.

Witnesses
W. N. Woodson
Juana M. Fallin

Inventor
W. Hayden
By H. A. R. Lacey, Attorneys.

UNITED STATES PATENT OFFICE.

WALTER HAYDEN, OF GALVESTON, TEXAS.

SPRING-WHEEL.

989,256.　　　　Specification of Letters Patent.　　Patented Apr. 11, 1911.

Application filed October 20, 1910. Serial No. 588,203.

*To all whom it may concern:*

Be it known that I, WALTER HAYDEN, citizen of the United States, residing at Galveston, in the county of Galveston and State of Texas, have invented certain new and useful Improvements in Spring-Wheels, of which the following is a specification.

This invention relates to improvements in wheels of the class known as spring wheels, or wheels with yieldable tires, and has for one of its objects to improve the construction and increase the efficiency and utility of devices of this character.

Another object of the invention is to provide a wheel of this character in which provision is made for resisting the pressure produced by abnormal weight, and to provide a wheel having independent sets of compound springs adapted to effectually support the load when the vehicle is subjected to abnormal weight.

Another object of the invention is to provide a wheel wherein provision is made for renewing impaired or broken parts without discarding the remainder of the wheel.

Another object of the invention is to provide a wheel wherein the parts may be readily inspected without removing the wheel from the vehicle or detaching any of the yieldable portions of the device.

Figure 1:
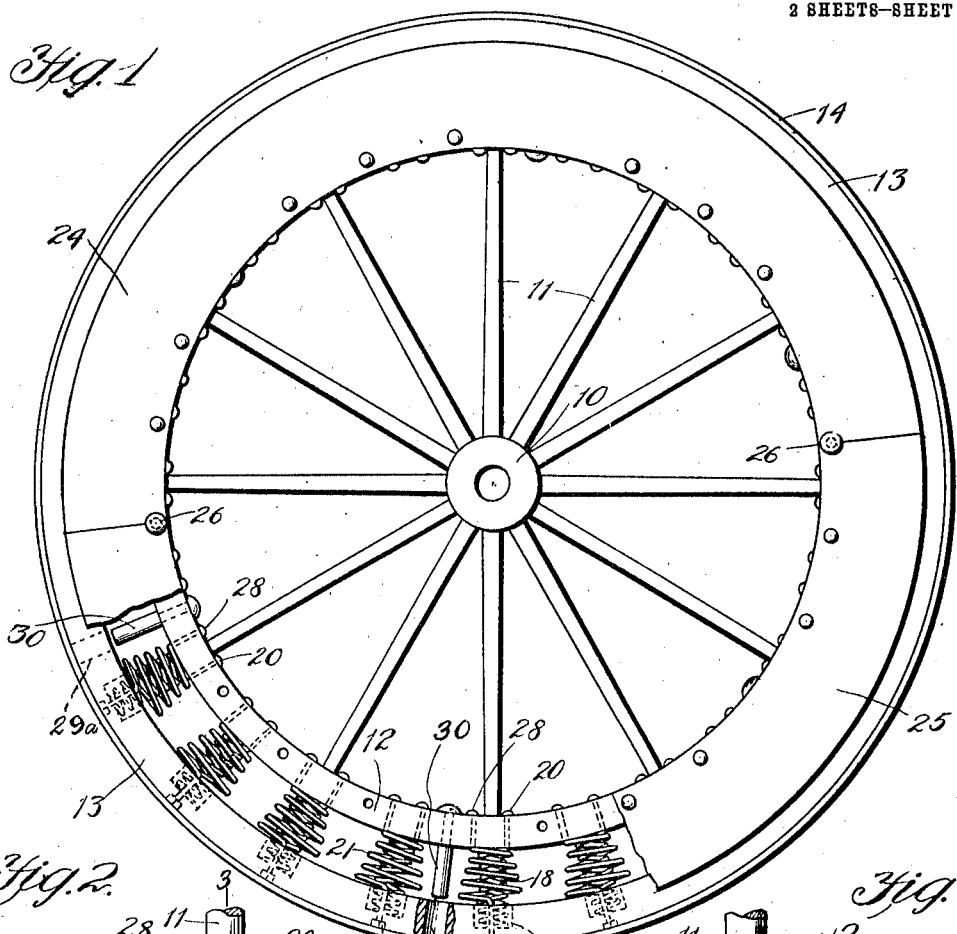
Figure 2:
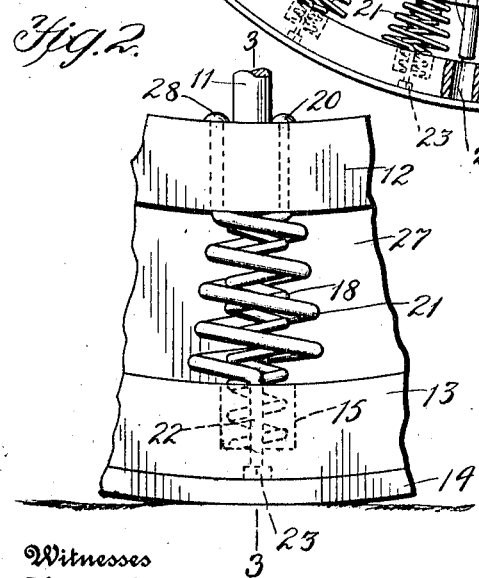
Figure 3:
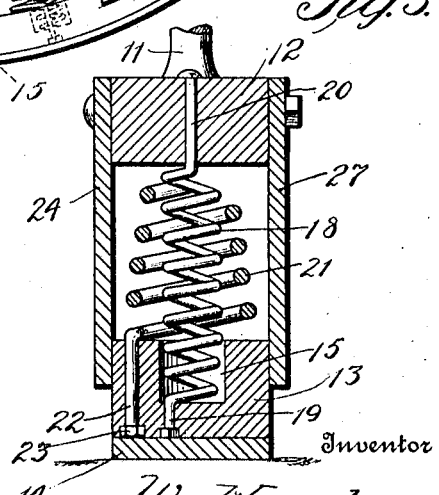
Figure 4:
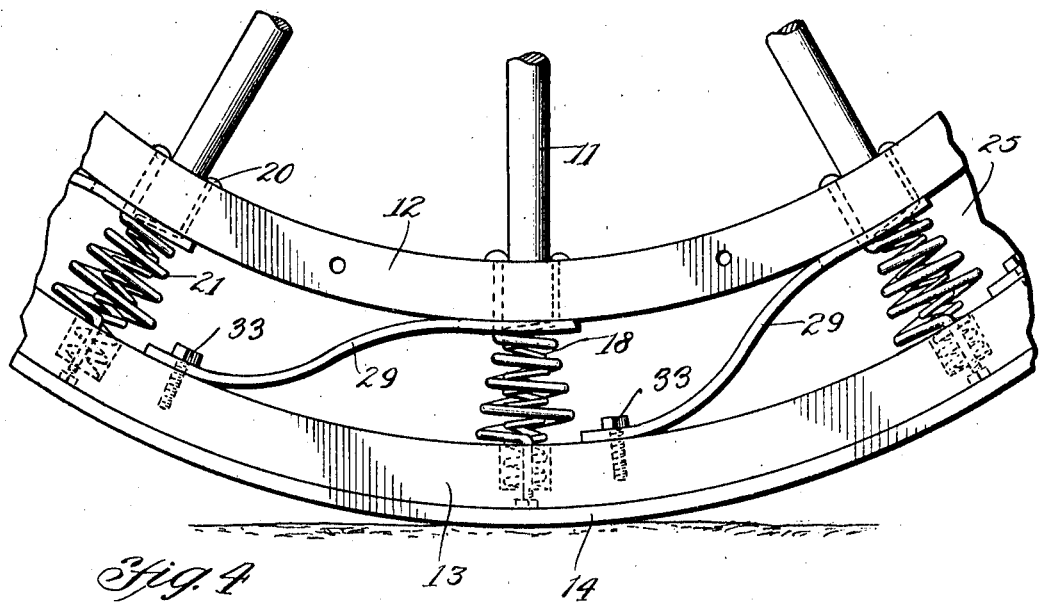
Figure 5:
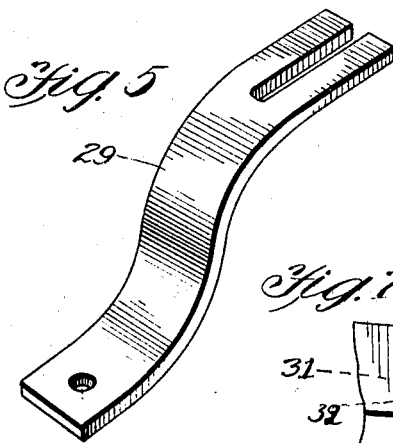
Figure 6:
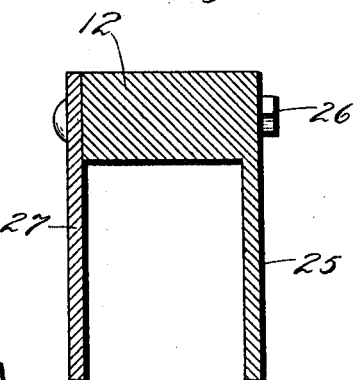
Figure 7:
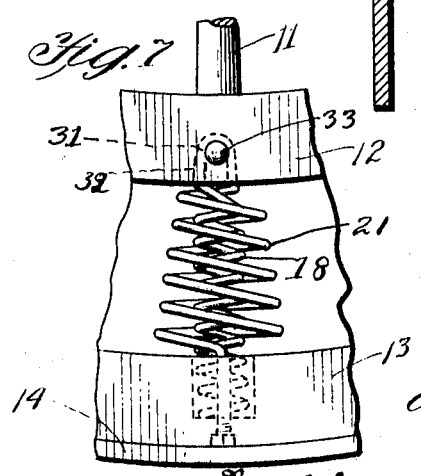

With these and other objects in view, the invention consists in certain novel features of construction hereinafter shown and described and then specifically pointed out in the claim; and in the drawings illustrative of the preferred embodiment of the invention, Figure 1 is a side elevation of the improved wheel partly in section; Fig. 2 is an enlarged detail of a portion of the improved wheel illustrating its construction more fully; Fig. 3 is a section on the line 3—3 of Fig. 2; Fig. 4 is an enlarged detail view illustrating a modification in the construction; Fig. 5 is a perspective view of one of the leaf springs employed in the modification shown in Fig. 4; Fig. 6 is a sectional detail illustrating another modification in the construction of a portion of the improved wheel; Fig. 7 is a view similar to Fig. 2 illustrating another modification in the construction.

Corresponding and like parts are referred to in the following description and indicated in all the views of the drawings by the same reference characters.

The improved wheel comprises a hub 10, spokes 11, an inner felly 12, an outer felly 13 spaced from the inner felly, and a tire 14 bearing around the outer felly 13. Formed at suitable intervals in the inner face of the outer felly 13 are small sockets or pockets 15. Seated in each of the sockets 15 is a coiled spring 18, the inner end of the coil being extended through the outer felly and riveted or otherwise rigidly secured therein as shown at 19. At their outer ends the coils 18 bear against the outer face of the inner felly 12 and are connected thereto by extending the inner terminal through the inner felly and riveting or otherwise securing it therein as represented at 20.

Surrounding each of the coiled springs 18 is a larger and preferably conical shaped coil spring 21, the outer terminal of each of the conical coils being extended through the outer felly 13 as shown at 22 and bolted or otherwise secured in position as shown at 23 and the inner ends extended through the inner felly and riveted or otherwise secured therein, as shown at 28.

In Figs. 1, 2 and 3 the springs 18—21 are separate and distinct, and independently secured to the felly members, while in Fig. 7 the two springs are shown integral with the inner ends of each pair of springs bent into a loop 31 which is inserted into a pocket 32 formed in the inner felly and secured in position by a pin 33 passing through the side walls of the felly and likewise through the socket and through the loop 31. This form of spring may be employed under certain conditions if required. The two coils are thus retained in their proper relative position, and do not interfere with each other during the operation of the wheel. Secured to the inside face of the inner felly 12 is a guard member, preferably in the form of two segmental plates 24—25, bolted or otherwise secured, as shown at 26, to the inner felly and lapping over a portion of the outer felly. Secured to the outer face of the inner felly are other guard plates, preferably in two parts similar to the plates 24—25, one of these other guard plates being represented at 27. The two sets of guard plates are preferably united to the inner felly by the same bolts 26, as shown in Fig. 2. At their confronting ends the plates 24—25 are provided with registering notches which bear around two of the bolts 26, the heads of the bolts and the notches thus bearing upon both of the plates and assisting in holding the latter in position. The outer portions of the guard plates are free to slide over the outer face of the outer felly 13 when the wheel is in operation, and thus perform the two-fold function of a means for preventing lateral movement between the felly members and also to cover the otherwise open space occupied by the springs and protecting the latter from dust, dirt and the elements. If preferred the plates 24—25 may be permanently connected to the inner felly, or formed integral therewith as represented in Fig. 5, while the outer plates 27 only are detachable.

The wheel may be constructed wholly of metal or partly of metal and partly of wood, and it is not desired therefore to limit the invention to any specific material from which to construct the same.

The improved wheel may be employed wherever yieldable wheels are required, and is designed to replace the ordinary pneumatic tires of automobiles and similar vehicles.

In Fig. 4 a modification in the construction is shown which consists in dispensing with one-half of the coiled springs 18—21 and substituting therefor leaf springs represented at 29, each of the springs being bolted or otherwise secured at 33 to the outer felly and forked at the opposite end for bearing upon the opposite sides of the holding portions 20 and 28 of the next spring and in contact with the outer face of the inner felly 12. This slight modification may be found advantageous under certain conditions, and does not constitute a departure from the principle of the invention or sacrifice any of its advantages. Formed in the outer felly 13 at suitable intervals are inwardly opening sockets $29^a$, and connected to the inner felly 12 in radial alinement with each socket is a pin 30 which extends toward the socket and adapted to enter the same when pressure is applied to the wheel by the load, to prevent lateral displacement between the parts under the strain of the load. By this means the efficiency and utility of the wheel is materially increased without materially increasing the expense or weight.

Having thus described my invention, what is claimed as new is:

A wheel including an inner felly, an outer felly spaced from the inner felly, a plurality of outer springs spaced apart and connected to said fellies, an inner spring within each of said outer springs and connected respectively to said outer and inner fellies, guard plates each formed of segmental members having registering notches in their contiguous ends, and fastening devices engaging in one of said fellies through said notches.

In testimony whereof, I affix my signature in presence of two witnesses.

WALTER HAYDEN. [L. S.]

Witnesses:
 V. STERENET,
 B. S. EVANS.